(12) United States Patent
Tamegger et al.

(10) Patent No.: US 9,594,408 B2
(45) Date of Patent: Mar. 14, 2017

(54) METHOD AND TRANSMITTER FOR SECUREMENT TO A PANEL

(71) Applicant: Endress + Hauser Conducta Gesellschaft für Mess- und Regeltechnik mbH + Co. KG, Gerlingen (DE)

(72) Inventors: Robert Tamegger, Eberdingen (DE); Joachim Albert, Leonberg (DE); Martin Lohmann, Gerlingen (DE); Oliver Durm, Benningen am Neckar (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 102 days.

(21) Appl. No.: 14/183,117

(22) Filed: Feb. 18, 2014

(65) Prior Publication Data

US 2014/0285958 A1   Sep. 25, 2014

(30) Foreign Application Priority Data

Mar. 19, 2013  (DE) .................. 10 2013 102 809

(51) Int. Cl.
*H02B 1/26*   (2006.01)
*G06F 1/18*   (2006.01)

(52) U.S. Cl.
CPC ............... *G06F 1/183* (2013.01); *H02B 1/26* (2013.01); *Y10T 29/49139* (2015.01)

(58) Field of Classification Search
CPC   H05K 7/00; H05K 7/005; H05K 7/02; H05K 7/14; G06F 1/183; H02B 1/26; Y10T 29/49139
See application file for complete search history.

(56) References Cited

U.S. PATENT DOCUMENTS

| | | | | | |
|---|---|---|---|---|---|
| 2,457,029 | A | * | 12/1948 | Brockway | H04B 1/08 174/59 |
| 4,296,280 | A | * | 10/1981 | Richie | H04R 1/02 181/150 |
| 5,310,149 | A | * | 5/1994 | Struthers | H04R 1/026 181/150 |

(Continued)

FOREIGN PATENT DOCUMENTS

| CN | 2722573 Y | 8/2005 |
|---|---|---|
| CN | 101256846 A | 9/2008 |

*Primary Examiner* — Carl Arbes
(74) *Attorney, Agent, or Firm* — Mark A. Logan; PatServe

(57) ABSTRACT

A transmitter and a method for mounting a transmitter on a panel, wherein the panel is a door or wall of an electrical cabinet, a display panel, a control panel or a diaphragm, wherein the transmitter includes a display module and a computer module, wherein the display module includes at least a first securement means and a cable, and the display module is connectable via the cable with the computer module. The method comprises the steps of: drilling at least a first hole in the panel, wherein the first hole is less than the area of the display module lying against the panel bringing the cable from a first side of the panel through the first hole to a second side of the panel securing the display module to the panel using a second securement means complementary to the first securement means securing the computer module to the second side, and connecting the computer module with the display module via the cable.

5 Claims, 4 Drawing Sheets

(56) References Cited

U.S. PATENT DOCUMENTS

| | | | | |
|---|---|---|---|---|
| 5,400,412 A * | 3/1995 | King, Sr. | ............... | H04R 1/025 |
| | | | | 181/150 |
| 7,155,214 B2 * | 12/2006 | Struthers | ................ | H04H 20/63 |
| | | | | 455/2.01 |
| 7,975,976 B2 * | 7/2011 | Wohlford | ............... | F16M 11/08 |
| | | | | 248/282.1 |
| 8,229,501 B2 * | 7/2012 | Struthers | ................ | H04H 20/63 |
| | | | | 455/556.1 |
| 8,359,929 B2 * | 1/2013 | Bourbeau | ............... | G01L 19/14 |
| | | | | 361/600 |
| 8,605,936 B2 * | 12/2013 | Proni | ....................... | H04R 1/02 |
| | | | | 181/148 |
| 9,167,326 B2 * | 10/2015 | Hardiman | ............... | H04R 1/025 |
| 2003/0123679 A1 * | 7/2003 | Dudleston | .............. | H04R 1/025 |
| | | | | 381/87 |

* cited by examiner

METHOD AND TRANSMITTER FOR SECUREMENT TO A PANEL

TECHNICAL FIELD

The invention relates to a method and a transmitter for securement to a panel, wherein the panel is a door or wall of an electrical cabinet, a display panel, a control panel or a diaphragm.

BACKGROUND DISCUSSION

An electrical cabinet accommodates, in a processing plant, a machine or a manufacturing installation, electrical and electronic components, which do not require direct contact with the process, machine or installation. Such components can involve electrical and electronic parts of sensors. Electrical cabinets are, depending on application, manufactured of painted, steel sheet, synthetic material, such as a plastic material, (e.g. when the material must withstand the elements), or aluminum sheet. In the case of corrosive environmental conditions as well as in the pharmaceutical and foods industries, cabinets are manufactured of stainless steel. Closing the cabinet prevents random and unintentional contact with voltage-carrying components; cabinets, which contain contactable parts carrying dangerous voltages, can only be opened with (special) tools (e.g. an electrical cabinet key, for instance, a key having a triangular or square cross section).

For controlling sensors, transmitters are used. Usually, regularly or at varying times, inputs to a sensor are made from the transmitter. The inputs are performed by maintenance personnel. In order that the electrical cabinet does not have to be opened each time, the transmitter is built into a wall or door of the electrical cabinet.

For this, a window must be cut in the wall of the electrical cabinet. The size of the window must correspond to the dimensions of the device. The device is placed in this hole and secured with appropriate mounting hardware. The window, thus, gets completely closed by the front of the device. The electrical connecting of the device occurs on the rear side of the device after its installation into the wall/door.

The window must conform within a few millimeters exactly to the housing size. Otherwise, the device could either not be placed in the window, or, if the window is too large, the housing front would not cover the hole and, thus, water or dirt could get into the electrical cabinet.

Often, the electrical cabinet door is of metal, which means that the sawing out of the window leads to much metal chips, saw dust, falling into the electrical cabinet, which can later lead to problems.

A special tool (metal saw/file) is required for the sawing. The sawing requires care and leads to long mounting times.

SUMMARY OF THE INVENTION

An object of the invention is to enable the mounting of a transmitter to an electrical cabinet using minimum time and a standard tool.

The object is achieved by a method which utilizes a transmitter. The transmitter is placed on a panel. The transmitter includes a display module and a computer module, wherein the display module is connectable via a cable with the computer module. In such case, the display module can be a simple element for display of various pieces of information, such as, for instance, measured values, etc. In an embodiment, the display module also includes servicing elements, such as buttons, keys etc., via which commands or controls can be performed.

The method includes the steps as follows: drilling at least a first hole in the panel, wherein the first hole is less than the area of the display module lying against the panel; bringing the cable from a first side of the panel through the first hole to a second side of the panel; securing the display module to the panel using a first securement means and a second securement means complementary to the first securement means; securing the computer module to the second side; and connecting the computer module with the display module via the cable.

If the transmitter is of at least two parts, the display module and the computer module, one part (the display module) can be placed on a panel. In such case, only a hole for the cable as connection to the computer module needs to be drilled. The display module can be secured, for instance, in the manner of a picture, by means of adhesive, hooks, eyes, etc.

In a preferred embodiment, the method further includes steps as follows: Drilling at least a second hole in the panel; and bringing the first securement means from the first side through the second hole to the second side.

The first securement means of the display module is, thus, brought through the at least one drilled hole and secured by means of the second securement means. Preferably, two to four first securement means are provided and corresponding holes drilled. It is, thus, assured, that the display module is secured safely and solidly. The second securement means can be embodied as a securement plate, which forms with the first securement means a shape-interlocking connection.

In order to save time and tool, the second securement means is used also as a drilling template and the display module then secured to the panel via the drilling template. The positions of the drilled holes are marked easily and correctly by applying the second securement means as drilling template.

The method provides, thus, a simple and fast mounting, which is little susceptible to defects. A major advantage is time savings. Only standard tooling is needed, namely battery powered drill and screw driver, and no saw, file or electric jig saw is necessary. Moreover, the danger of metal chips and dust in the electrical cabinet is much less.

Preferably, the computer module is secured to the second side on a support rail, especially on a top hat rail. This enables a simple wiring of the transmitter, since it is secured in the electrical cabinet on the support rail (or alternatively on a rear wall) and, thus, cable from end devices such as sensors can be simply introduced.

In a further development, the computer module includes an intelligent unit, especially a microcontroller, communication modules, digital and/or analog sensor modules, digital and/or analog actuator modules, relay or voltage supply modules. The computer module can, thus, be expanded to include exactly the required functionalities.

The object is further achieved by a transmitter for securement to a panel. The transmitter includes a display module and a computer module, wherein the display module is connectable with the computer module via a cable. A first securement means and a second securement means complementary to the first securement means are provided, which are embodied for securement of the display module on a first side of the panel. The computer module is embodied to be applied to a second side of the panel.

Preferably, the first securement means is embodied to be pushed through a hole in the panel, wherein the first hole is less than the area of the display module lying against the panel. The first securement means is, for instance, a screw or the like.

In a preferred embodiment, the second securement means is a drilling template.

In a further development, the computer module is embodied for securement to the second side on a support rail, especially on a top hat rail.

Additionally, the computer module includes an intelligent unit, especially a microcontroller, communication modules, digital and/or analog sensor modules, digital and/or analog actuator modules, relay or voltage supply modules.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
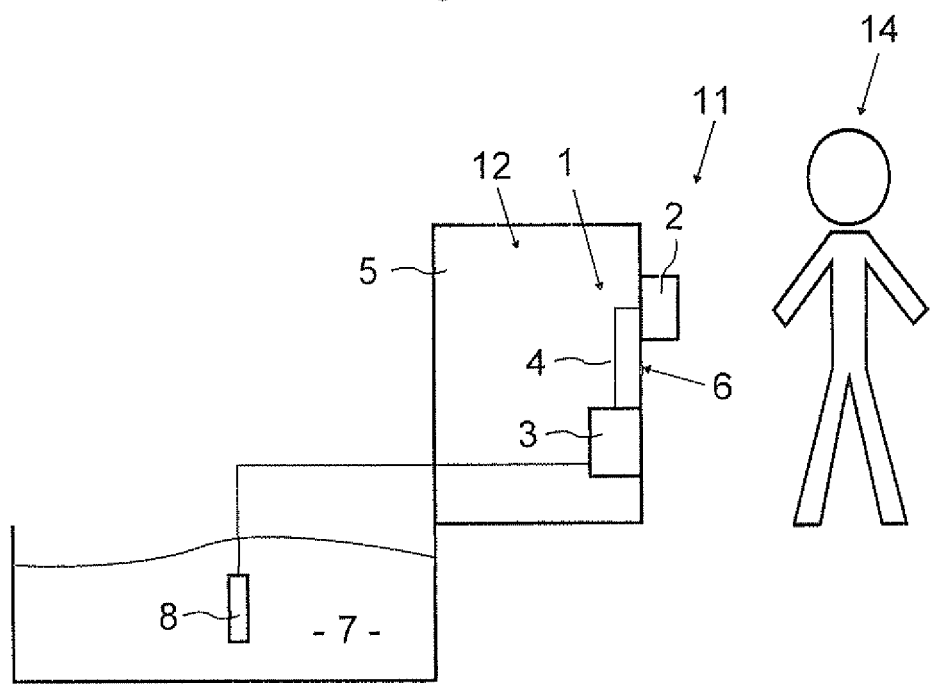
FIG. 1 is a schematic overview of the transmitter.

In the figures, equal features are provided with equal reference characters.

The transmitter of the invention in its totality bears the reference character 1 and is shown in FIG. 1. Transmitter 1 is used in, respectively on, an electrical cabinet 5. The transmitter is divided in two and is composed of the elements, display module 2 and computer module 3. Display module 2 and computer module 3 are connected with one another via a cable 4. In such case, the display module 2 can be a simple element for display of various information, such as measured values, etc. Furthermore, an option is that the display module 2 also has operating knobs, buttons, keys or the like, via which commands or control signals can be entered by operating personnel 14.

Display module 2 is placed on the panel 6 and includes first securement means 9 and a second securement means 10 embodied as a securement plate (see FIGS. 2a-e). The first securement means 9 and the second securement means 10 serve to secure the display module 2 to the panel 6.

The "panel" 6 in the sense of the invention can be a door or wall of an electrical cabinet, a display panel, a control panel or a diaphragm. The display module 2 is located thus on a first side 11, externally on the electrical cabinet 5. The display module 2 should be easily accessible by operating personnel 14. The computer module 3 is located on a second side 12, internally in the electrical cabinet 5.

The computer module 3 is secured on a support rail, especially on a top hat rail, also referred to as a DIN rail. Transmitter 1, respectively computer module 3, includes an intelligent unit, especially a microcontroller, communication modules, digital and/or analog sensor modules, digital and/or analog actuator modules, relay or voltage supply modules. In the example in FIG. 1, a sensor 8 is connected to the computer module 4. Sensor 8 measures a measured parameter in the medium 7. The sensor 8 is, for instance, a sensor for pH, redox-potential (also an ISFET sensor), temperature, conductivity, pressure, oxygen, especially dissolved oxygen, or carbon dioxide; an ion-selective sensor; an optical sensor, especially a turbidity sensor, a sensor for optically determining oxygen concentration, or a sensor for determining number of cells and cell structures; a sensor for monitoring certain organic or metal compounds; a sensor for determining concentration of a chemical substance, for example, a certain element or a certain compound; or a biosensor, e.g. a glucose sensor.

FIGS. 2a-2e illustrate the method of the invention.

Figure 2A:
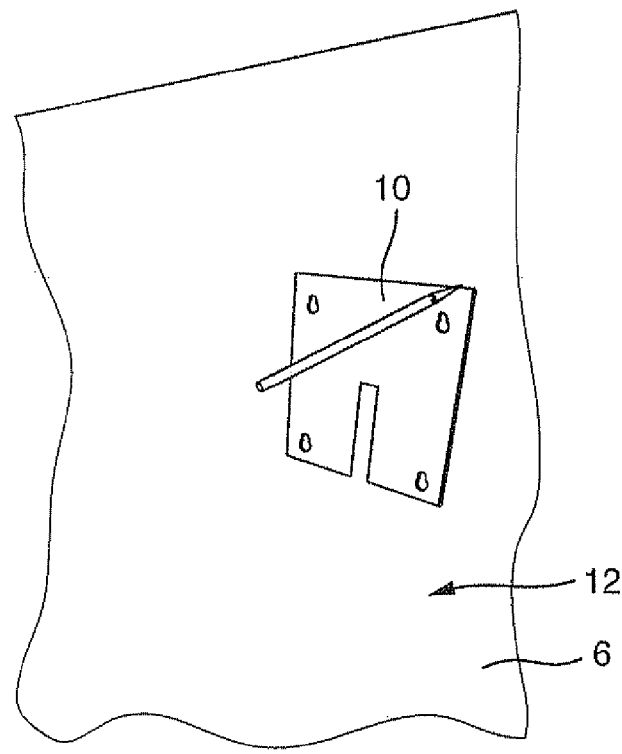
FIGS. 2a-2e are individual steps of the method of the invention.
Figure 2B:
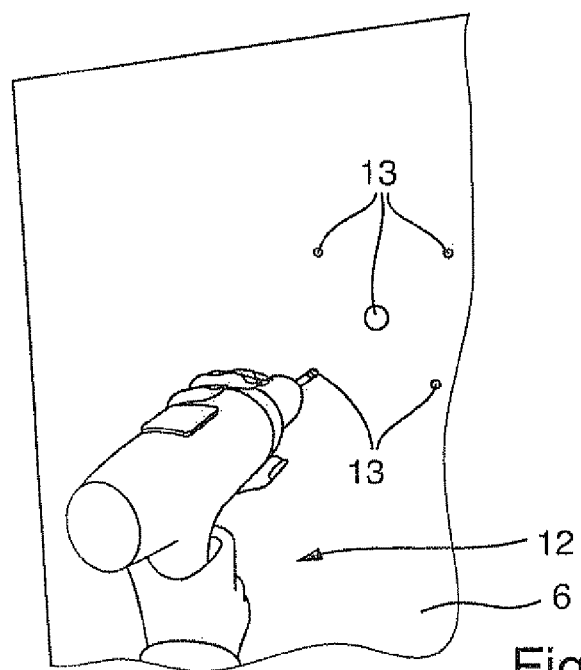

In FIG. 2a, with the assistance of the second securement means 10, markings for holes to be drilled into the panel 6 are made. The second securement means 10 serves thus also as a drilling template. Then, in FIG. 2b, the holes 13 are drilled. In such case, at least one hole must be drilled, through which the cable 4 can be led (the central hole 13). The remaining holes 13 (in the example in FIG. 2b, the four additional holes) serve for securement of the display module 2. The diameters of the holes correspond respectively to the diameter of the cable 4 and the diameters of the securement means.

Figure 2C:
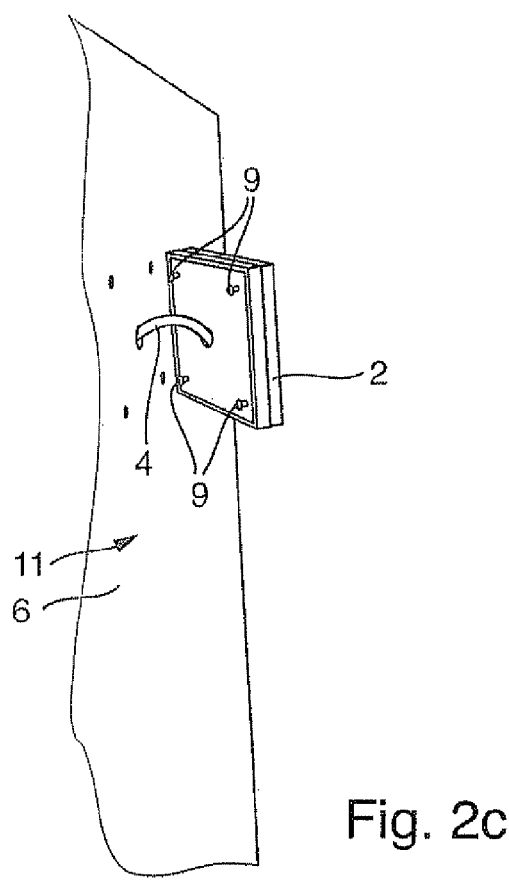

In FIG. 2c, the cable 4 of the display module 2 is led from the first side 11 through the central hole 13. Located on the display module 2 are first securement means 9, whose arrangement agrees with the drilled holes 13. The first securement means 9 are, for instance, screws, pins, rivets or the like. The securement means 9 are thus inserted through the holes 13.

Figure 2D:
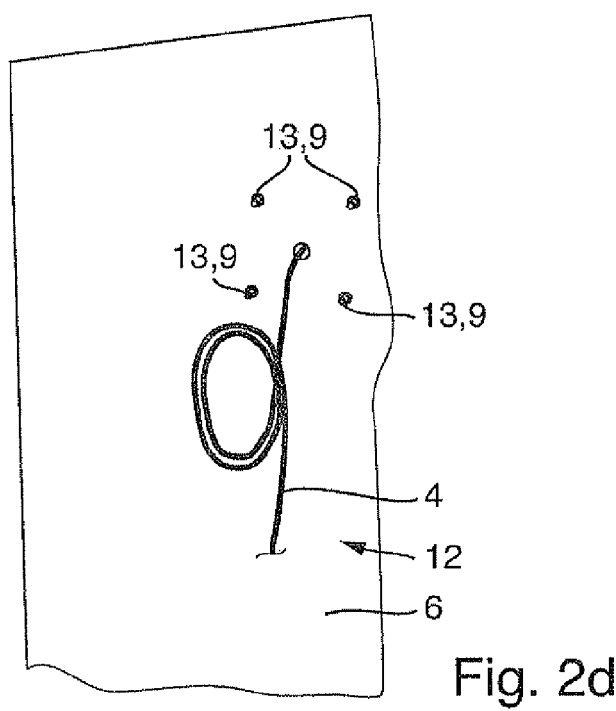
Figure 2E:
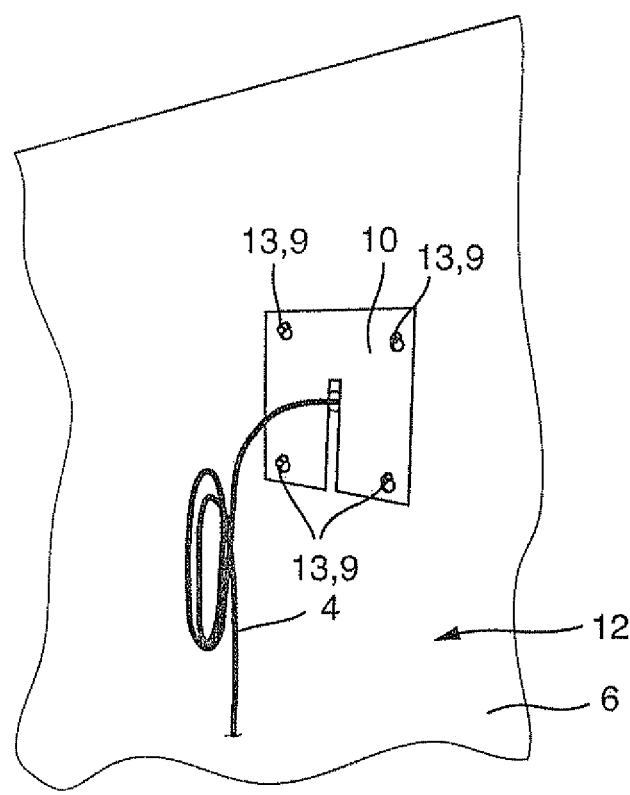

FIG. 2d shows the result on the second side 12. For securement, the second securement means 10 is brought in FIG. 2e into engagement with the first securement means 9. Located in the second securement means 10 are corresponding recesses, cavities, etc., which accommodate the first securement means 9. If the first securement means 10 are embodied as screws, these are screwed tight.

Alternatively to the explained method, only the cable 4 is led through the panel 6, and the first, respectively second securement means 9, respectively 10 are embodied as hooks, eyes, or the like. The display module 2 can, in such case, be hung in the manner of a picture. Also, the display module 2 can be adhered, soldered or the like to the panel 6.

The invention claimed is:

1. A method for mounting a transmitter on a panel, wherein the panel is a door or wall of an electrical cabinet, a display panel, a control panel or a diaphragm, wherein the transmitter includes a display module and a computer module, wherein the display module is connectable via a cable with the computer module, the method comprising the steps of:
   drilling at least a first hole in the panel, wherein the first hole is less than the area of the display module lying against the panel;
   bringing the cable from a first side of the panel through the first hole to a second side of the panel;
   securing the display module to the panel using a first securement means and a second securement means complementary to the first securement means,—securing the computer module to the second side; and
   connecting the computer module with the display module via the cable.

2. The method as claimed in claim 1, further comprising the steps of:
   drilling at least a second hole in the panel; and
   bringing the first securement means from the first side through the second hole to the second side.

3. The method as claimed in claim 2, wherein:
   the second securement means is used as a drilling template and the display module is secured to the panel via the drilling template.

4. The method as claimed in claim 1, wherein:
   the computer module is secured to the second side on a support rail, especially on a top hat rail.

5. The method as claimed in claim 1, wherein:
the computer module includes an intelligent unit, especially a microcontroller, communication modules, digital and/or analog sensor modules, digital and/or analog actuator modules, relay or voltage supply modules.

\* \* \* \* \*